A. BRENNER.
VALVE FOR PNEUMATIC TIRES.
APPLICATION FILED MAR. 24, 1917.
1,249,014.
Patented Dec. 4, 1917.
2 SHEETS—SHEET 1.
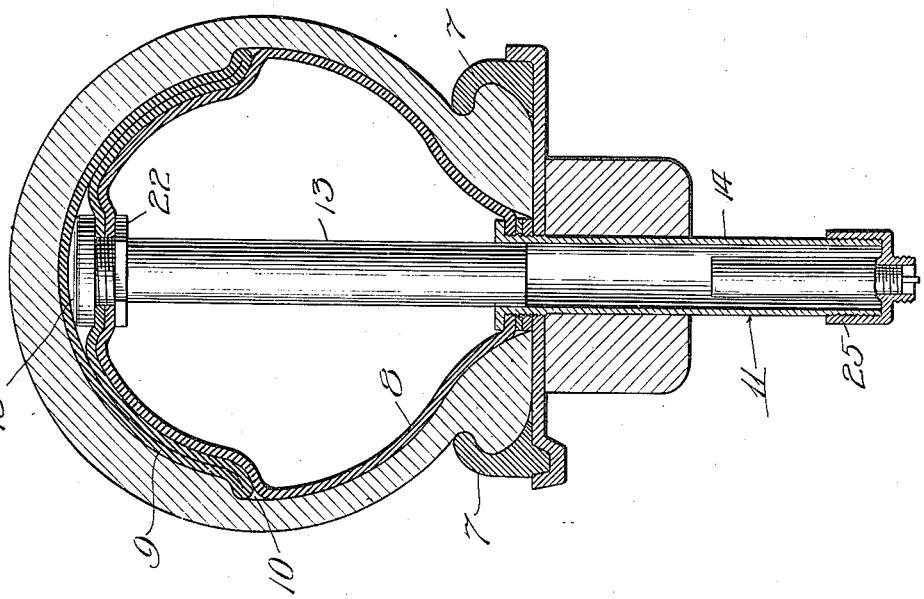
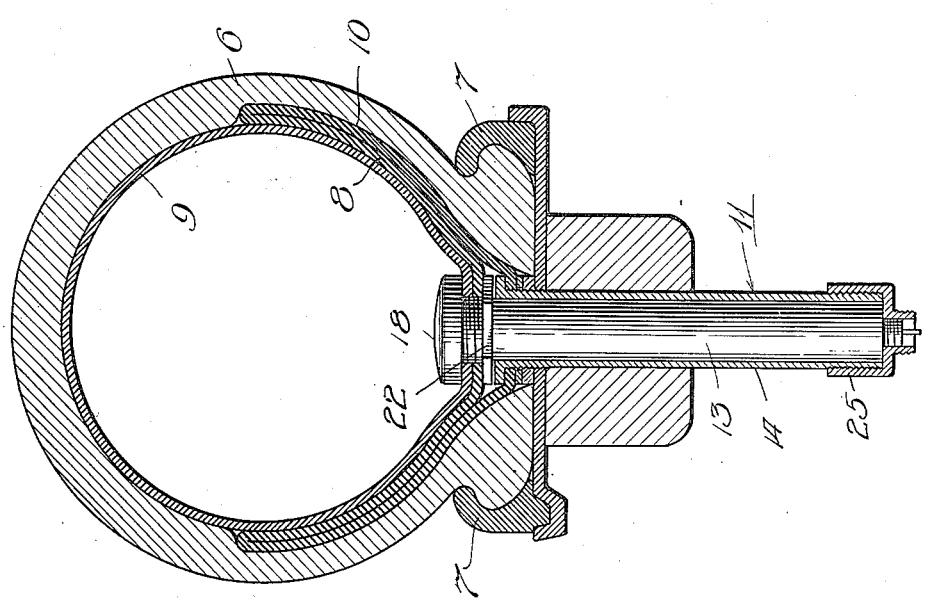
Witness:
Harry S. Gaither
Inventor:
Abel Brenner
by Fleming & Fleming
Attys

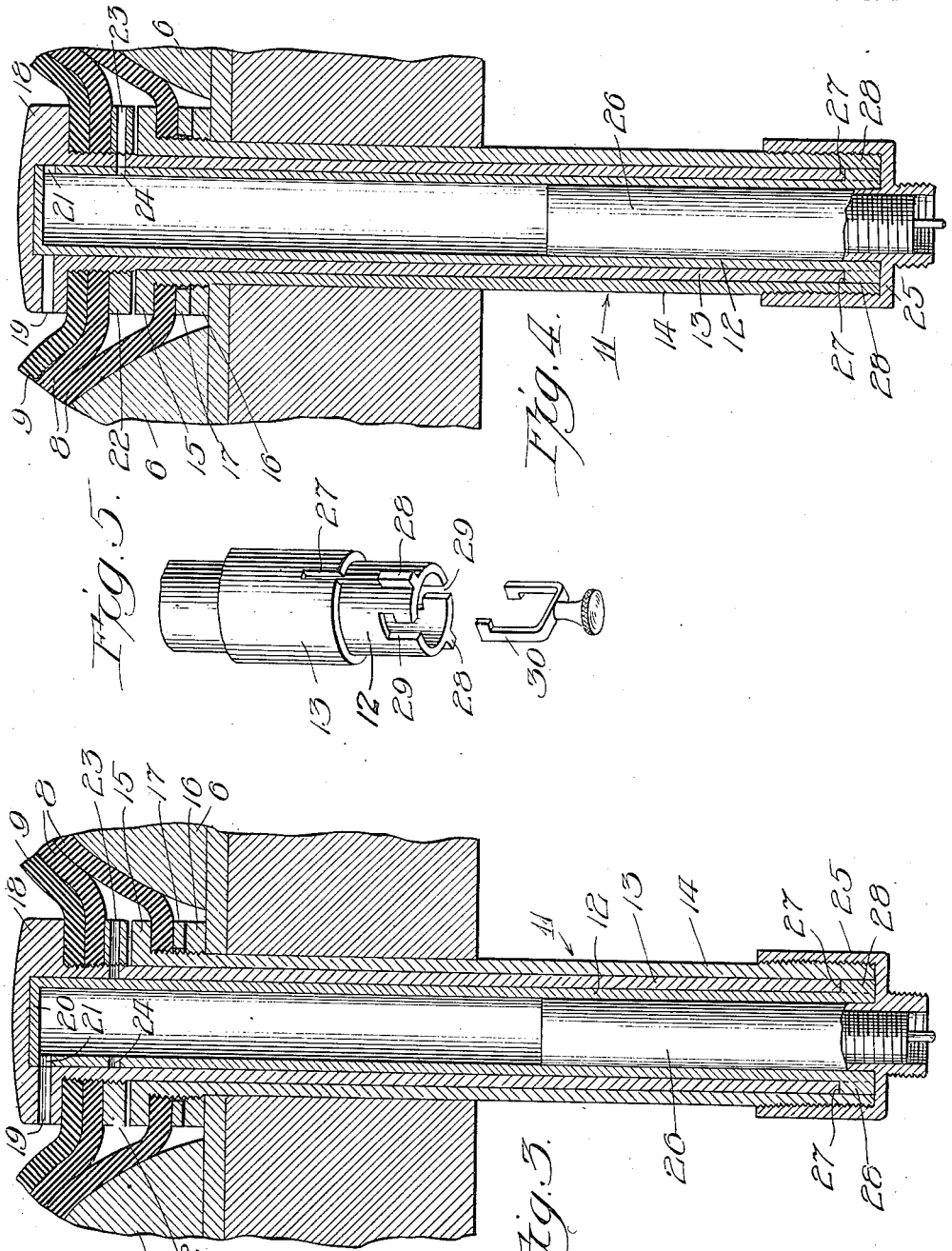

UNITED STATES PATENT OFFICE.

ABEL BRENNER, OF CHICAGO, ILLINOIS.

VALVE FOR PNEUMATIC TIRES.

1,249,014.     Specification of Letters Patent.     Patented Dec. 4, 1917.

Application filed March 24, 1917. Serial No. 157,256.

*To all whom it may concern:*

Be it known that I, ABEL BRENNER, a citizen of the United States, residing at Chicago, county of Cook, and State of Illinois, have invented certain new and useful Improvements in Valves for Pneumatic Tires, of which the following is a specification.

This invention relates to a valve adapted for use with pneumatic tires having a double or duplex inner tubing, and is concerned particularly with certain features of construction by which the valve is enabled to communicate with either compartment of the tubing, as desired.

The tire herein shown in connection with my invention consists of the usual outer casing and two separate air compartments therein, formed either by using separate tubes or a single tube which is divided into compartments. It is an essential object of the present valve that it should permit the inflation of either of the two compartments, but not both at the same time. It is also desirable that the valve should be easily manipulated, simple in construction, and effective to prevent leakage from one tire compartment to another, or to the atmosphere. These and other objects of my invention will more fully hereinafter appear from the specification and claims, and from the accompanying drawings, in which—

Figure 1 is a transverse section through a pneumatic tire equipped with a valve of the present invention, the outer compartment within the tire being inflated;

Fig. 2 is a view similar to Fig. 1 showing the inner compartment within the tire inflated;

Fig. 3 is an enlarged detail showing the valve adjusted for communication with the outer compartment;

Fig. 4 is a view similar to Fig. 3 showing the valve adjusted for communication with the inner compartment; and Fig. 5 is a detail view in perspective of the inlet end of the valve with its inner sleeve slightly withdrawn, the adjusting key for this purpose being shown detached.

Referring now to Figs. 1 and 2, I have illustrated a tire comprising an outer casing 6 formed as is usual to be secured in place between tire retaining flanges 7 mounted on a vehicle wheel. Within the casing are two pneumatic tubes 8 and 9 occupying respectively inner and outer positions relative to the wheel center. Preferably the casing is recessed interiorly along its walls which are in proximity to the flanges 7 to provide a groove or pocket 10 within which the inner tube 8 may lie in a deflated condition when the outer tube 9 is inflated.

Operatively arranged upon the wheel is a valve 11 having means of communication with each of the tubes 8 and 9. This valve, which is shown in detail in Figs. 3, 4 and 5, preferably comprises three sleeves 12, 13 and 14 occupying respectively inner, intermediate and outer positions. The sleeve 14 at its inner end is provided with a flanged head 15 adapted to rest upon the inner side of the inner wall of the inner tube 8. On the outer side of the same wall of this tube is a nut 16 threaded upon the sleeve 14 and spaced from the tube by a washer 17.

The intermediate sleeve 13 which closely fits within the outer sleeve extends into the interior of the outer tube 9 and is provided with a flange or head 18 bearing against the inner side of the inner wall of this tube. A port 19 is formed within the head extending from the inner side of the sleeve to communicate with the interior of the tube 9. The inner sleeve 12 fits closely within the intermediate sleeve 13, and is provided with a closed inner end 20 which seats within a recess formed in the head 18 of the intermediate sleeve. A port 21 which traverses the wall of the sleeve 12 is adapted to register with the port 19 when the sleeves 12 and 13 are correctly positioned relative to each other. By means of the ports 19 and 21 communication is established between the outside atmosphere and the interior of the tube 9.

Threaded upon the intermediate sleeve adjacent the inner side of the outer wall of the inner tube 8 is a nut 22 having a port 23 formed therein communicating with the interior of the tube 8. An opening 24 in the inner sleeve is adapted to register with the port 23 when the sleeve 12 is rotated properly for this purpose. In the present valve communication through the ports 19 and 23 can be established through only one at a time, the other port being then closed.

The outer end of the tire valve which communicates with the air is formed to receive a cap 25 of approved construction. A valve 26 may be threaded within this cap to prevent the escape of air to the atmosphere. The inner and intermediate sleeves are normally locked to each other, so as to preserve communication with one of the tubes 8 or 9, according as may be desired. A convenient form of lock is shown in Fig. 5, consisting of one or more slots 27 formed at the extremity of the intermediate sleeve 13, lugs or wings 28 formed on the inner sleeve being adapted to seat within the slots. To rotate the inner sleeve with respect to the intermediate sleeve, it is necessary first to withdraw the inner sleeve by a sliding movement sufficient to disengage the lugs 28 from the slots 27, and for this purpose, I have provided in the inner sleeve bayonet slots 29 adapted to be engaged by a suitable key 30 which will enable the inner sleeve to be slidingly withdrawn from the intermediate sleeve as far as necessary to execute the desired turning movement which, in the construction shown, will be substantially 180 degrees. After the inner sleeve is returned to its normal position within the intermediate sleeve, communication through one of the ports is then established, the particular port which is open depending upon the rotative position of the inner sleeve relative to the intermediate sleeve.

In operation, the outer tube 9 will ordinarily be inflated, the tire valve being adjusted to preserve communication through the port 19. In case of a puncture and the consequent deflation of the tube 9, the other tube 8 may be inflated, in the manner indicated in Fig. 2. The inflation of the tube 8 may be brought about by removing the cap 25, inserting the key 30 to withdraw and turn the inner sleeve 12, thereafter resetting the sleeve 12 properly for communication through the port 23 and then introducing air under pressure through the valve into the tube 8. By this means the occupants of the vehicle will be enabled to proceed with substantially no interruption or discomfort.

It will be noted that the present tire valve is simple of construction and easily manipulated. The outer sleeve remains always stationary, while the inner and intermediate sleeves may change position together when required to do so (see Figs. 1 and 2). The tube 8, which is normally deflated, remains within the pocket 10 so as to present no obstruction or interference to the other tube when inflated. It will be observed, therefore, that the valve of my invention, which is adaptable to two-compartment pneumatic tires, is characterized by certain features of adjustability which enable the valve to communicate with either of the compartments, one at a time, but not both simultaneously, the manipulations for this purpose consisting of a sliding, rotary and resliding movement of an inner sleeve relative to the other parts of the valve.

I claim:

1. In combination with a pneumatic tire including a casing and two tubes therewithin arranged concentrically and exteriorly of each other, a valve operatively connected with each tube, the inner end of the valve communicating with the interior of one tube adjacent its inner wall and with the interior of the other tube adjacent its outer wall, and the outer end of the valve being arranged exteriorly of both tubes and in a fixed position relative to the casing, there being a telescopic connection between the inner and outer ends of the valve to permit the inner valve end to move longitudinally as required by the relative positions of the tubes within the casing, and means for opening and closing communication through the valve with either of the tubes as desired, substantially as described.

2. In combination with a pneumatic tire including a casing and two tubes therewithin arranged exteriorly of each other, a valve having its inner end arranged for communication with both tubes, one at a time, and having its outer end extended exteriorly of both tubes and held in a fixed position relative to the casing, the outer end of the valve being telescopingly connected with the inner valve end to permit of longitudinal movements as required by the relative positions of the tubes within the casing, substantially as desired.

3. In combination with a pneumatic tire including a casing having two endless air compartments therewithin arranged concentrically and exteriorly of each other, a valve having its inner end arranged for communication with one compartment adjacent its inner wall and with the other compartment adjacent its outer wall, and having its outer end extended exteriorly of the casing and held in a fixed position relative thereto, the inner valve end being fixedly secured to the walls of each compartment and being extensible relative to the outer valve end as required by the condition of each air compartment, substantially as described.

4. In combination with a pneumatic tire including a casing and two tubes therewithin, a valve comprising three sleeves occupying relatively inner, intermediate, and outer positions, there being two ports formed in the inner sleeve each arranged for communication with separate tubes and two ports formed in the intermediate sleeve each arranged to register one at a time, with one of the ports in the inner sleeve whereby communication through the valve to either tube may be established, the outer sleeve being extended exteriorly of the casing and in fixed relation thereto, and the two other sleeves being arranged to move longitudinally of the outer sleeve as required by the positions of the tubes, substantially as described.

ABEL BRENNER.